United States Patent Office 3,128,196
Patented Apr. 7, 1964

3,128,196
SURFACE MODIFIED SILICA
Edward Keith Pierpoint, Largs, Scotland, assignor to Imperial Chemical Industries Limited, London, England, a corporation of Great Britain
No Drawing. Filed May 12, 1961, Ser. No. 109,508
Claims priority, application Great Britain June 10, 1960
7 Claims. (Cl. 106—308)

This invention relates to surface modified materials and more particularly to surface modification of filler materials such as finely divided silica.

Filling materials such as, for example, finely divided silica, have been used for many purposes in a wide variety of compositions. One of the more important applications of such fillers is in the preparation of synthetic elsatomer compositions, for example, organopolysiloxane elastomer compositions. In these compositions a variety of different types of finely divided silica have been used as fillers for various purposes. These silicas include the natural silicas, for example, the diatomaceous earths, precipitated silicas, silica aerogels and the so-called fume silicas which are prepared by burning silicon tetrachloride in hydrogen. In many of the synthetic elastomeric compositions such as the organopolysiloxane compositions, these silicas in the state in which they are normally available do not give entire satisfaction. There have therefore, been many proposals to modify the surface of finely divided silicas in order to remove these disadvantages and to attain the desired aims. Treatments which have been used or proposed for use include, for example, attaching ester groups to the silica, treating the silica with materials such as octamethylcyclotetrasiloxane and other similar methods. Many of the hitherto available methods do in fact give considerable improvement but it cannot be said that they are in all cases entirely satisfactory. Thus, for example, it is not possible to get organopolysiloxane elastomers having high hardness combined with good elongation at break and good tensile strength and which still retain good tensile strength and elongation at break if subjected to high temperatures by curing organopolysiloxane elastomer compositions at intermediate or low temperatures, for example, 150 to 170° C.

An object of the present invention is to provide a surface modified silica which can be used to give organopolysiloxane elastomers of improved properties, for example, of improved tear strength, hardness, elongation and tensile strength. Another object is to provide a surface modified silica which can be used to give organopolysiloxane elastomer compositions capable of being cured at intermediate or low temperatures to elastomers of improved properties which will be retained when the elastomers are subjected to higher temperatures. Other objects will appear hereinafter.

According to the present invention these objects are accomplished by a process comprising treating a finely divided silica with a mixture of (1) a liquid cyclic siloxane and (2) an organosilicon compound of the general formula

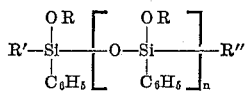

where R is an alkyl group having not more than 3 carbon atoms, R' and R", which may be the same or different, are phenyl groups or alkyl or alkoxy groups having not more than 3 carbon atoms, $n$ is 0, 1, 2 or 3 and not more than 2 aryl groups are attached to any one silicon atom.

The cyclic siloxane is preferably a diorganosiloxane. The organo groups therein may be alkyl groups such as methyl or ethyl groups, or unsaturated groups such as vinyl groups or a mixture of these. Suitable siloxanes include, for example, octamethylcyclotetrasiloxane, decamethylcyclopentasiloxane, duodecamethylcyclohexasiloxane, tetramethyltetravinylcyclotetrasiloxane and the like. It is however, in general, preferred to use siloxanes in which the organo groups are methyl groups and octamethylcyclotetrasiloxane is particularly preferred.

Organosilicon compounds of the class (2) which may be used in the process of our invention include, for example, diphenyldimethoxysiloxane, diphenyldiethoxysilane, diphenyldi-n-propylsilane, phenyltrimethoxysilane, phenylmethyldimethoxysilane, dimethyldiphenyldimethoxydisiloxane, diphenyltetramethoxydisiloxane, dimethyltriphenyltrimethoxytrisiloxane and other similar silanes and siloxanes. It is, however, preferred that R be a methyl group and that R' and R" be phenyl, methyl or methoxy groups. Diphenyldimethoxysilane is particularly preferred.

The relative proportions of the two compounds used in the process of our invention may of course vary widely. Thus, for example, the cyclic siloxane may vary from about 5 to about 95 percent by weight of the mixture. It is however, in general, preferred to use the cyclic siloxane in amounts from about 40 to about 60 percent by weight of the mixture.

The total amount of mixture used to treat the silica filler may also vary widely, for example, from about 5 to about 40 percent by weight thereof. It is however, normally preferred to use the mixture in amount from about 10 to about 25 percent by weight of the filler.

The process of our invention can be applied to a wide variety of finely divided silicas, i.e., silicas of particle size not greater than about 10 microns. Silicas which can be treated include, for example, naturally occurring silicas such as the diatomaceous earths, precipitated silicas, silica aerogels and the fume silicas. It has been found however, that the most advantageous results are obtained when the silica is a fume silica.

The silica may be treated with the mixture of compounds by any one of a variety of methods. To obtain optimum results it is, however, essential to ensure that the treating media is evenly distributed throughout the total bulk of silica being treated. In one method, for example, the compounds are intimately admixed with the silica in a suitable incorporator while in another method the treating media may be dissolved in a solvent and the silica treated with the solution after which the solvent is removed, for example, by slight heating in vacuo. In a third and preferred method the silica to be treated is fluidised in a container and the treating media introduced through an atomiser. In this method the atomised treating media is preferably introduced at a level well below the apparent surface of the fluidised mass. There are, of course, other methods which may be used and the method used is unimportant per se provided that the treating media is properly dispersed throughout the silica being treated. The treating process of our invention is also normally carried out at ambient temperatures. Higher temperatures can, of course, be used if desired but little if any, advantage is gained by the use thereof.

The advantageous properties conferred by the treated fillers of our invention on organopolysiloxane elastomers cannot be obtained by using untreated fillers and adding to the elastomer compositions the two treating materials or even by using a filler treated with one and adding the other at the incorporation stage.

Our invention is further illustrated by the following examples in which all parts and percentages are by weight.

*Example 1*

2500 parts of a fume silica of surface area 300 m.$^2$/g. and average particle size 5 to 20 m$\mu$ were introduced into a cylindrical container open at the top. The silica in the container was fluidised by introducing air thereinto in a suitable manner. A mixture of 250 parts of octamethylcyclotetrasiloxane and 250 parts of diphenyldimethoxysilane were atomised into the container at the same point as the fluidising air was being introduced. After the introduction of the treating mixture was completed fluidisation was ceased and the treated silica removed from the container for use.

A number of organopolysiloxane elastomer compositions were prepared using this treated filler by mixing together various amounts of filler with 100 parts of a linear methylvinylpolysiloxane having a ratio of organo groups to silicon atoms of 2.002 to 1 and having a ratio of vinyl groups to silicon atoms of 1 to 600 and a molecular weight of about $5 \times 10^5$ and 1 part of red iron oxide.

It was found that these compositions freshened easily even after storage for more than eight weeks. (The freshening of an organopolysiloxane elastomer composition is the process of working the material until it is in a plastic state suitable for moulding or extrusion. Such working is usually accomplished by repeated passage of the composition between a pair of differential speed rolls.) The freshened compositions were mixed with 0.5 part of 2:4-dichlorobenzoylperoxide per 100 parts of composition and cured by pressing a 400 lb./sq. in. at 115° C. for 10 minutes. The compositions were each given a further heating in air and the physical properties of the resulting elastomer determined. The results obtained are given in the table below.

| Parts treated filler per 100 parts organopolysiloxane | After-cure of 1 hr. at 150° C. | | | After-cure of 1 hr. at 150° C. and a further 24 hrs. at 250° C. | | | |
|---|---|---|---|---|---|---|---|
| | Tensile strength (lb./sq. in.) | Elongation at break (percentage) | Hardness (degrees BS) | Tensile strength (lb./sq. in.) | Elongation at break (percentage) | Hardness (degrees BS) | Tear strength (lb.) |
| 50 | 1,600 | 630 | 64 | 1,050 | 370 | 70 | |
| 60 | 1,600 | 550 | 71 | 950 | 360 | 79 | 16 |
| 70 | 1,400 | 410 | 81 | 900 | 230 | 86 | |

For purposes of comparison an organopolysiloxane elastomer composition was made up by mixing together 50 parts of the same (untreated) fume silica, 100 parts of the same linear methylvinylpolysiloxane, 1 part of red iron oxide, 5 parts of octamethylcyclotetrasiloxane and 5 parts of diphenyldimethoxysilane. This composition was stored at 20° C. for 4 weeks. The milling time required to freshen the composition after this was 9 minutes whereas in the case of the composition of identical composition prepared with the treated filler of our invention only 1.5 minutes were required. A catalyst was added and the composition cured as described above given an elastomer having the following properties

| After-cure of 1 hour at 150° C. | | | After-cure of 1 hour at 150° C. and 24 hours at 250° C. | | | |
|---|---|---|---|---|---|---|
| Tensile strength, lb./sq. in. | Elongation at break, percent | Hardness, Degrees BS | Tensile strength, lb./sq. in. | Elongation at break, percent | Hardness, degrees BS | Tear strength, lb. |
| 830 | 320 | 64 | 920 | 225 | 72 | 8.0 |

It will be obvious that these properties are very much inferior to those of the identical composition having the treated filler incorporated.

*Example 2*

2500 parts of the fume silica used in Example 1 were treated in the manner described therein with a mixture of 250 parts of octamethylcyclotetrasiloxane and 250 parts of a methoxypolysiloxane (sold by Midland Silicones Limited under the name MS 650) prepared from methylphenyl and mono-phenyl substituted organosilicon intermediates and having the average chemical formula

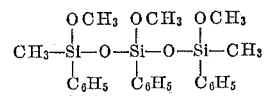

A number of organopolysiloxane elastomer compositions were prepared using this treated filler and the linear methylvinylpolysiloxane used in Example 1. The compositions so prepared freshened easily after storage for more than 8 weeks. The freshened compositions were mixed with 0.5 part of 2:4-dichlorobenzoyl peroxide per 100 parts of elastomer composition and cured in the manner described in Example 1. The elastomers so obtained had the properties given in the following table.

| Parts treated filler per 100 parts organopolysiloxane | After-cure of 1 hr. at 150° C. | | | After-cure of 1 hr. at 150° C. and a further 24 hrs. at 250° C. | | | |
|---|---|---|---|---|---|---|---|
| | Tensile strength (lb./sq. in.) | Elongation at break (percentage) | Hardness (degrees BS) | Tensile strength (lb./sq. in.) | Elongation at break (percentage) | Hardness (degrees BS) | Tear strength (lb.) |
| 50 | 1,450 | 470 | 70 | 1,000 | 320 | 75 | |
| 60 | 1,450 | 380 | 76 | 1,000 | 260 | 82 | 14 |
| 70 | 1,350 | 345 | 82 | 950 | 210 | 88 | |

*Example 3*

2500 parts of a fume silica of average surface area 150–200 m.$^2$/g. and average particle size 10–40 m$\mu$ were intimately mixed with a mixture of 250 parts of octamethylcyclotetrasiloxane and 250 parts of diphenyldimethoxysilane in the manner described in Example 1.

An organopolysiloxane elastomer composition was prepared by mixing together 60 parts of the so-treated silica, 100 parts of the linear methylvinylpolysiloxane used in Example 1 and 1 part of red iron oxide (Composition A).

A comparable composition having identical constituents but using a silica not according to the invention was made up (Composition B). In this case the same untreated silica was used but before incorporating it was treated with 10 percent of octamethylcyclotetrasiloxane by intimately mixing in a closed vessel at 20° C. The diphenyldimethoxysilane was added during the incorporating of the silica with the linear organopolysiloxane.

After storage at 20° C. for 4 weeks both compositions freshened very easily. Portions of each were catalysed by the addition of 0.5 part of 2:4-dichlorobenzoyl peroxide per 100 parts of composition and cured to elastomers by heating as described in Example 1. The properties obtained are given in the table below.

| Elastomers prepared from composition | After-cure of 1 hour at 150° C. | | | After-cure of 1 hour at 150° C. and 24 hrs. at 250° C. | | |
|---|---|---|---|---|---|---|
| | Tensile strength, p.s.i. | Elongation at break, percent | Hardness, ° BS | Tensile strength, p.s.i. | Elongation at break, percent | Hardness, ° BS |
| A | 1,100 | 375 | 67 | 875 | 275 | 71 |
| B | 1,100 | 600 | 52 | 830 | 350 | 68 |

It will be seen that the elastomer prepared using the treated silica of our invention has only a slight increase in hardness on prolonged heating while that prepared from the other silica has a very considerable increase in hardness.

What we claim is:

1. A process for the production of a surface modified silica which comprises providing a quantity of a finely divided silica and intimately admixing said silica with from about 5 to about 40% by weight thereof of a mixture of (1) a liquid cyclic siloxane and (2) an organosilicon compound of the general formula

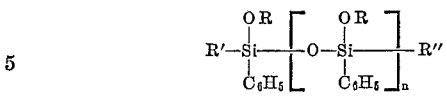

where R is a radical selected from methyl, ethyl and propyl groups, R' and R" are radicals selected from alkyl and alkoxy groups having up to three carbon atoms, and phenyl groups, n is a whole number having a value from 0 to 3 inclusive, and at least one of the groups R' and R" is a group other than a phenyl group when n is 0, said cyclic siloxane being in amount from about 5 to 95% by weight of said mixture of cyclic siloxane and organosilicon compound.

2. A process as claimed in claim 1 wherein the cyclic siloxane is a diorganosiloxane.

3. A process as claim in claim 2 wherein the cyclic siloxane is octamethylcyclotetrasiloxane.

4. A process as claimed in claim 1 wherein the organosilicon compound (2) is diphenyldimethoxysilane.

5. A process as claimed in claim 1 wherein the cyclic siloxane is used in amount from about 40 to about 60 percent by weight of the mixture.

6. A process as claimed in claim 1 wherein the amount of mixture used is from about 10 to about 25 percent by weight of said silica.

7. A surface modified silica produced by a process as claimed in claim 1.

References Cited in the file of this patent

UNITED STATES PATENTS

| 2,870,108 | Nickerson | Jan. 20, 1959 |
| 2,870,109 | Nickerson | Jan. 20, 1959 |
| 2,891,875 | Phreaner | June 23, 1959 |
| 2,993,809 | Bueche et al. | Oct. 23, 1959 |
| 2,938,009 | Lucas | May 24, 1960 |
| 3,004,859 | Lichtenwalner | Oct. 17, 1961 |